(12) United States Patent
Kendrick

(10) Patent No.: US 9,986,395 B2
(45) Date of Patent: May 29, 2018

(54) METHOD AND SYSTEM FOR BUNDLING MULTIPLE SERVICES THROUGH A MOBILE PLATFORM

(71) Applicant: Rok Mobile International Ltd., Culver City, CA (US)

(72) Inventor: Jonathan Kendrick, Los Angeles, CA (US)

(73) Assignee: ROK MOBILE INTERNATIONAL LTD., Culver City, CA (US)

( * ) Notice: Subject to any disclaimer, the term of this patent is extended or adjusted under 35 U.S.C. 154(b) by 0 days. days.

(21) Appl. No.: 15/140,287

(22) Filed: Apr. 27, 2016

(65) Prior Publication Data
US 2017/0078859 A1    Mar. 16, 2017

Related U.S. Application Data

(60) Provisional application No. 62/283,867, filed on Sep. 15, 2015.

(51) Int. Cl.
*H04W 4/16* (2009.01)
*H04W 68/00* (2009.01)
(Continued)

(52) U.S. Cl.
CPC ............ *H04W 4/16* (2013.01); *G06Q 20/102* (2013.01); *G06Q 20/16* (2013.01);
(Continued)

(58) Field of Classification Search
CPC ........... H04W 4/16; H04W 4/24; H04W 4/12; H04W 68/005; H04W 4/14; H04W 4/003;
(Continued)

(56) References Cited

U.S. PATENT DOCUMENTS

2008/0125103 A1    5/2008   Mock
2009/0252306 A1    10/2009  Bates et al.
(Continued)

FOREIGN PATENT DOCUMENTS

GB    2448957       11/2008
WO    WO-2015127204  8/2015

OTHER PUBLICATIONS

International Search Report and Written Opinion, dated Jul. 21, 2016, Application No. PCT/US2016/034476.

*Primary Examiner* — Chuong A Ngo
(74) *Attorney, Agent, or Firm* — Womble Bond Dickinson (US) LLP

(57) ABSTRACT

A telecommunications service provider agrees to a pre-paid plan including phone, text and data services, which it provides to a user through her mobile device. The provider's computer system then sends a notification to the user's mobile device that refers to benefits and contains a launch prompt. When the launch prompt is selected by the user, an application program is automatically launched in the mobile device, or a browser in the mobile device is automatically navigated to a website, which prompts the user to identify herself using minimum personal information (e.g., first and last name, date of birth and postal code.) In response, the mobile device is then signaled by the computer system of the telecommunications service provider to display to the user an offer of i) a pre-bundled group of, or ii) an individually selectable variety of, products or services (the benefits.) Other embodiments are also described.

19 Claims, 6 Drawing Sheets

(51) Int. Cl.
  *H04M 17/00*  (2006.01)
  *H04W 4/00*  (2018.01)
  *H04W 4/14*  (2009.01)
  *G06Q 20/16*  (2012.01)
  *G06Q 30/02*  (2012.01)
  *G06Q 30/04*  (2012.01)
  *G06Q 40/08*  (2012.01)
  *H04W 4/12*  (2009.01)
  *H04W 4/24*  (2018.01)
  *G06Q 20/10*  (2012.01)

(52) U.S. Cl.
  CPC ......... *G06Q 30/0241* (2013.01); *G06Q 30/04* (2013.01); *G06Q 40/08* (2013.01); *H04M 17/35* (2013.01); *H04W 4/003* (2013.01); *H04W 4/12* (2013.01); *H04W 4/14* (2013.01); *H04W 4/24* (2013.01); *H04W 68/005* (2013.01)

(58) Field of Classification Search
  CPC ...... G06Q 20/16; G06Q 40/08; G06Q 20/102; G06Q 30/04; G06Q 30/0241; H04M 17/35
  See application file for complete search history.

(56) References Cited

U.S. PATENT DOCUMENTS

| | | |
|---|---|---|
| 2011/0015946 A1 | 1/2011 | Buckowsky et al. |
| 2011/0137776 A1* | 6/2011 | Goad ................... G06Q 20/102 705/34 |
| 2011/0145086 A1 | 6/2011 | Valdes et al. |
| 2011/0208418 A1* | 8/2011 | Looney ................. G06Q 20/10 701/532 |
| 2012/0245988 A1 | 9/2012 | Pace et al. |
| 2013/0204645 A1 | 8/2013 | Lehman et al. |
| 2013/0337793 A1 | 12/2013 | Prakash et al. |
| 2014/0279212 A1* | 9/2014 | Bennett ............. G06Q 30/0601 705/26.8 |
| 2015/0019265 A1* | 1/2015 | Roll ....................... G06Q 40/08 705/4 |

* cited by examiner

Last Chance

We still need some basic information from you to make you eligible for this Benefit ROK MOBILE telecommunication services. If not received within the next 10 days you will forfeit this valuable benefit at no additional cost to you.

Remind Me Later | Launch Now

FIG. 3C

Brand Name
Telecommunications Services

Composite Bill

Jan 1, 2016

Account number: 1234 | PIN: *****

Mobile phone number: 310-321-1234
Name: John Doe
Account Address: 123 Maple Street City, State Postal Code
Contact number: 310-321-1234
Account notifications: 310-321-1234
Bill delivery option: john.doe@emailaddress.com <u>SUMMARY OF CHARGES</u>

Previous Balance
$0.00

<u>USAGE: CALLS/TEXTS</u>

| | |
|---|---|
| 1,254 USAGE MINUTES ------------- | $31.24 |
| 54 Texts ----------------------- | $3.25 |
| <u>EQUIPMENT</u> ---------------------- | $0.00 |

⎫ 142

<u>Benefits - Group Price - bundled</u> ------------ $15.50  143
Road Side Protect
Accidental Death Insurance
Telemedicine
ID Theft Insurance

Current Balance ------------------- $49.99   146   Due Date: Feb 1, 2016

FIG. 5

METHOD AND SYSTEM FOR BUNDLING MULTIPLE SERVICES THROUGH A MOBILE PLATFORM

This non-provisional patent application claims the benefit of the earlier filing date of U.S. Provisional Patent Application No. 62/283,867, filed Sep. 15, 2015.

FIELD

An embodiment of the invention is related to a system and method in a mobile telecommunications platform for enabling an unknown user of a mobile telecommunication service plan to select a pre-bundled set of, or individually selectable variety of, products and services that are offered to the user at a group rate. Other embodiments are also described.

BACKGROUND

A difficult obstacle of telecommunication providers that offer pre-paid cellular telecommunication services is churn. Churn occurs when the service provider looses a customer to another service provider. Providers of pre-paid cellular phone services are highly susceptible to churn because of the inherent service model, which allows a user to purchase and use a cellular phone with all of the standard features included in most cellular phones (including voice, text, and data (also referred to as Internet access) services) without the requirement that the user subscribe to a long term service contract or be subjected to overage charges. The ability to purchase a pre-paid cellular phone and service is straightforward. Such phones are available over the counter at many brick and mortar stores where a person can purchase a pre-paid phone and its associated service. The purchase may occur with various means of payment such as cash, debit card, and credit card. As a result of poor credit, many users' only means of payment is cash. In that case, users may only be identifiable to service providers by the mobile telephone number that is assigned to the phone. The phone is programmed with the assigned phone number. The telecommunication service provider is paid up front, and then the pre-paid user is allotted a specified number of minutes, text messages and data usage for the assigned phone number. Costs of use are then deducted from the amount that has been pre-paid by the user. When the user reaches a $0 balance, she is no longer able to use the phone for telecommunication services.

BRIEF DESCRIPTION OF THE FIGURES

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, in the interest of conciseness and reducing the total number of figures, a given figure may be used to illustrate the features of more than one embodiment of the invention, and not all elements in the figure may be required for a given embodiment.

FIGS. 3a-3c show the display in the mobile device of example, received notifications.

FIG. 5 shows content of an example composite bill or invoice.

DETAILED DESCRIPTION

Several embodiments of the invention with reference to the appended drawings are now explained. Whenever the shapes, relative positions and other aspects of the parts described in the embodiments are not explicitly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1:
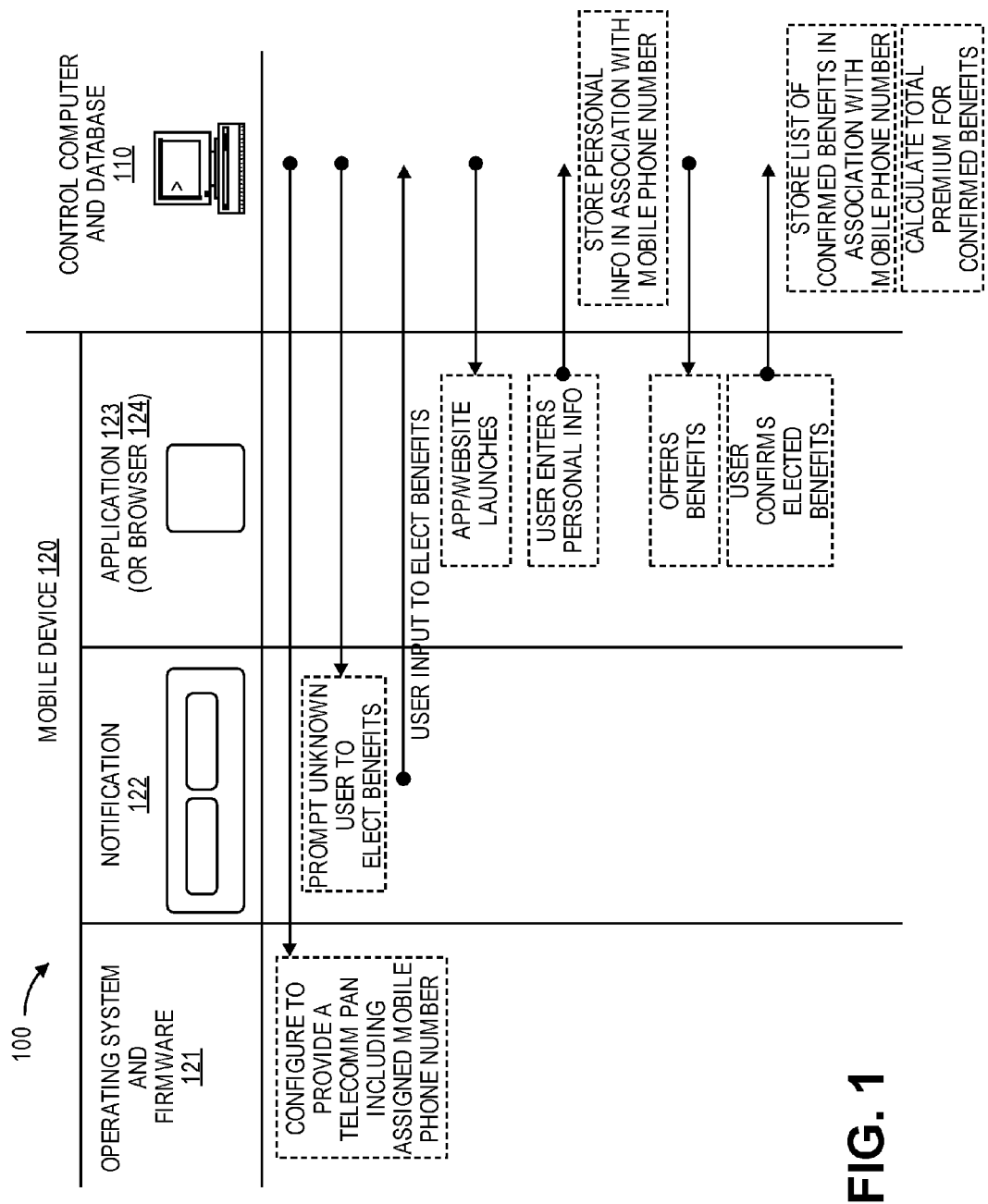
FIG. 1 shows a system for enabling a user of a mobile device to select a pre-bundled or individually selectable variety of products and services.

FIG. 1 shows a system 100 (mobile platform), for enabling a user of a mobile device to select a pre-bundled set of, or individually select a from a predetermined variety of, insurance and other products and services, being offered by the same service provider that is providing a telecommunication service to the user. Through the use of mobile messaging technologies, the system 100 may enable the telecommunications service provider to reduce the level of churn that results from a lack of commitment by their users, by making it easier for the user to sign up for important non-telecomm related services (the "benefits" as referred to here) such as insurance products, without the user having to spend hours researching the Web to find a reasonable solution from amongst those being offered by numerous insurance vendors. In addition, the system 100 is configured so that the pre-bundled and pre-determined variety of benefits (non-telecomm products and services) that can be offered to a user dynamically change as the user's situation, while remaining a customer of the telecommunications service provider, changes, so as to better suit the changing lifestyle and desires of the user. Once the elected benefits have been confirmed by the user, they can be provided (through the telecommunications service provider), and charges for those benefits will appear in a composite bill or invoice that contains both the telecommunications service charges and the charges for the non-telecomm benefits.

As shown, the system 100 includes a programmed processor 110 and a mobile device 120. As will be described in greater detail below, the mobile device 120 includes the necessary operating system 121, and other software components including an application program 123 (e.g., a mobile app), a Web browser 124, or an application programming interface (API), needed to i) communicate with the programmed processor 110, over any suitable computer networking protocol suite (e.g., HTTP over TCP/IP over a cellular data connection, SMS text messaging over a cellular or mobile communication link), and ii) display received notifications 122 to the user and receive manual selections and other data from the user through a user interface (e.g., a touchscreen in the mobile device 120.) Each element of the system will be described below by way of example.

In one embodiment, the programmed processor 110 may be a stand-alone computer that includes a database. This is also referred to here as a "central" database, due to the one-to-many nature of the communications between the programmed processor 110 and the numerous instances of the mobile device 120 (the latter being associated with their respective users.) In other embodiments, the programmed processor 110 may be a computer that is connected to a database, or it may be a network of computers and databases, configured to operate as a master in a master slave relationship with the mobile device 100. In either case, the programmed processor 100 is administered by the telecommunication service provider. As depicted in FIG. 1, the programmed processor 110 is programmed to access and configure the mobile device 120, via the operating system 121 for example, to be used for a pre-paid telecommunication plan (also referred to here as a pre-paid phone plan) including the provision of voice, text, and data services to the user of the mobile device 120. The programmed processor 110 is programmed to access as many instances of the mobile device 120 as desired by an administrator of the telecommunications service provider, each instance being associated with a respective user (customer) of telecommunication services provided by the same service provider.

Figure 2:
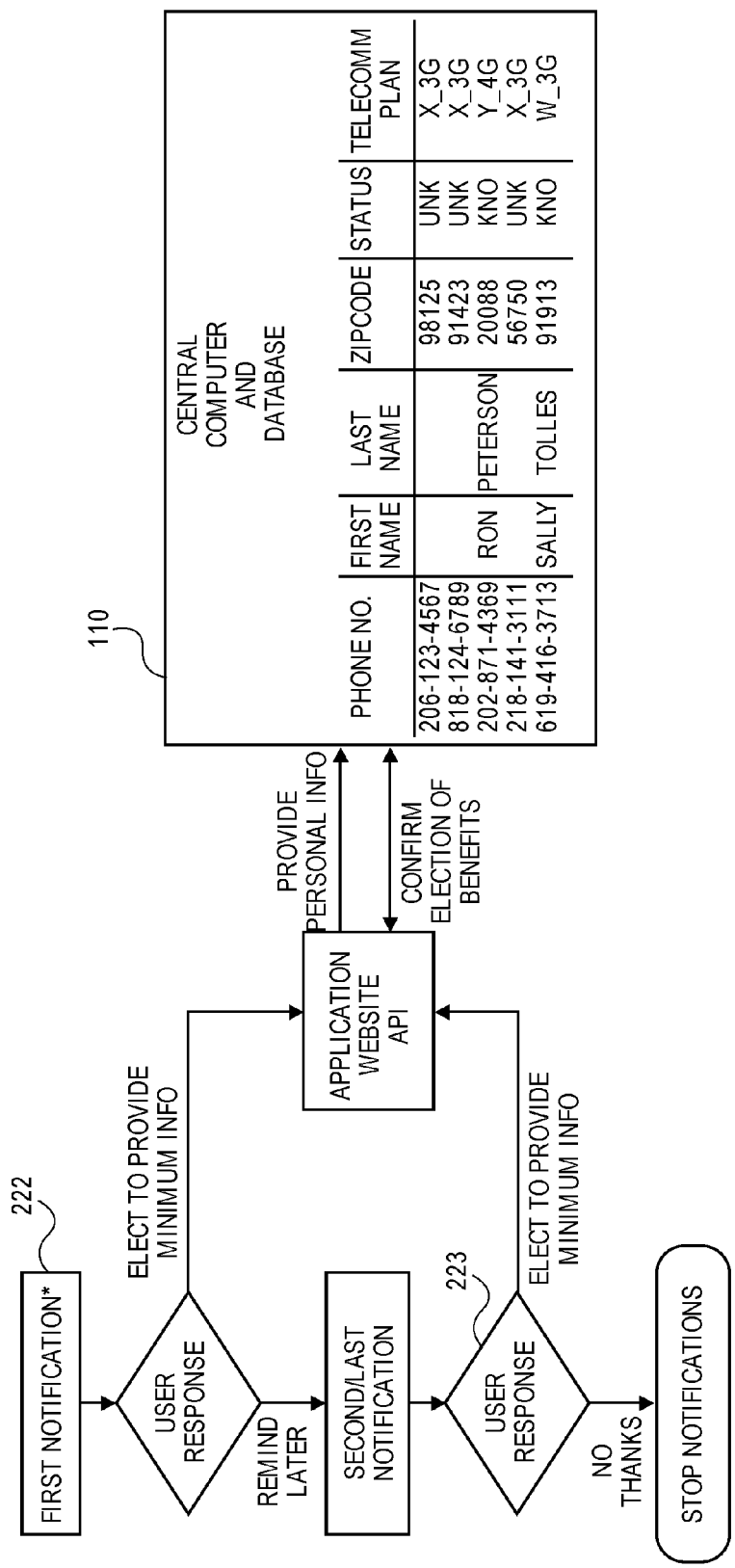
FIG. 2 shows a flow diagram of a method for enabling a user of a mobile device to select a pre-bundled or individually selectable variety of products and services.

The database, to which the programmed processor 110 has access, stores a list of identifiers that are in effect associated with known and unknown users of mobile devices, respectively, where each identifier is associated with a respective mobile device or respective user of the mobile device—see FIG. 2. Each identifier may be a mobile phone number, and it may also be associated with an account number (not shown) generated by the telecommunications service provider (for example that is unique to each mobile phone number.) A user of the mobile device 120 may be "known" (status=kno) in that in addition to the mobile phone number, at least her full name and residence zipcode are also available to the system, and are stored in the database as also being associated with the mobile phone number that is assigned to the mobile device 120; it is also contemplated that the user may be "unknown" (status=unk), meaning that she is identifiable only by a customer identification code, that is stored in the database, which may be a randomly generated number, or the mobile phone number that is assigned to the mobile device 120. The list may also include information on the particular mobile or cellular telecommunications service plan (the "telecomm plan" field) that is assigned to service the mobile device 120 of the user. Such information may be entered into the database at the time a user purchases (from the service provider) either a pre-paid phone plan or an installment service contract, for obtaining telecommunication services such as voice, text and cellular data, from the service provider (as provided through the mobile device 120.)

In one embodiment, a user's eligibility for the benefit (to receive an offer from the telecommunication service provider for a pre-bundled set of, or individually selectable variety of, insurance services and/or other products or services) requires that the user maintain an active account with the telecommunication service provider for a minimum period of time ("minimum eligibility period"), for example 15 days, 20 days, or 30 days from a start date. Furthermore, so as to not harass or otherwise diminish the users experience, the offer of a pre-bundled set, or individually selectable variety, of insurance products and services is made (repeated) only for a limited time after the user becomes eligible ("maximum offer period"), for example 30 days, 45 days, or 60 days from the end of the minimum eligibility period. With this in mind, and still referring to FIG. 1, the programmed processor 110 sends a first notification to the mobile device 120 of an unknown user, to be displayed by the mobile device 120 as a notification 122 to the unknown user, within the first half of the billing cycle following the minimum eligibility period (in which the user has maintained an active account with the telecommunication provider.) The notification 122 may be sent in accordance with known techniques, for example as a push notification that is based on the earlier installation of an application program 123, which may have been installed into the mobile device 120 upon the user having signed up for an account with the service provider. Alternatively, the notification 122 may be sent as a text message (based on the known phone number that has been assigned to the mobile device 120 and which is used as the destination of the text message.) The notification 122 may be displayed on a touch screen of the mobile device 120, and any prompt contained therein can be "pressed" or selected by the user, for example by touching a corresponding graphic or text that is visible on the touch screen.

To precipitate the user of the mobile device 120 to select a pre-bundled set of, or an individually selectable variety of, insurance products and services, the mobile device 120 first displays the received notification 122. The notification 122 may include a reminder prompt 136 and a launch prompt 137, both of which are displayed simultaneously upon receipt of the notification 122 in the mobile device 120—see FIG. 3a. The reminder prompt 136 contains text that in effect informs the user that, if selected (pressed), she will be reminded at a later time about being eligible to receive the benefit. The launch prompt 137, when pressed, may immediately launches an application program 123 in the mobile device, either as a native application that is stored in the mobile device 120, or as a Web application that is viewable in a browser 124 that is stored in the mobile device 120. Through these means, the programmed processor 110 then performs the rest of the process depicted in FIG. 1 and explained further below, presenting an offer of benefits (additional services or products) to the user via the application program 123 (on the mobile device 120.)

Figure 3A:
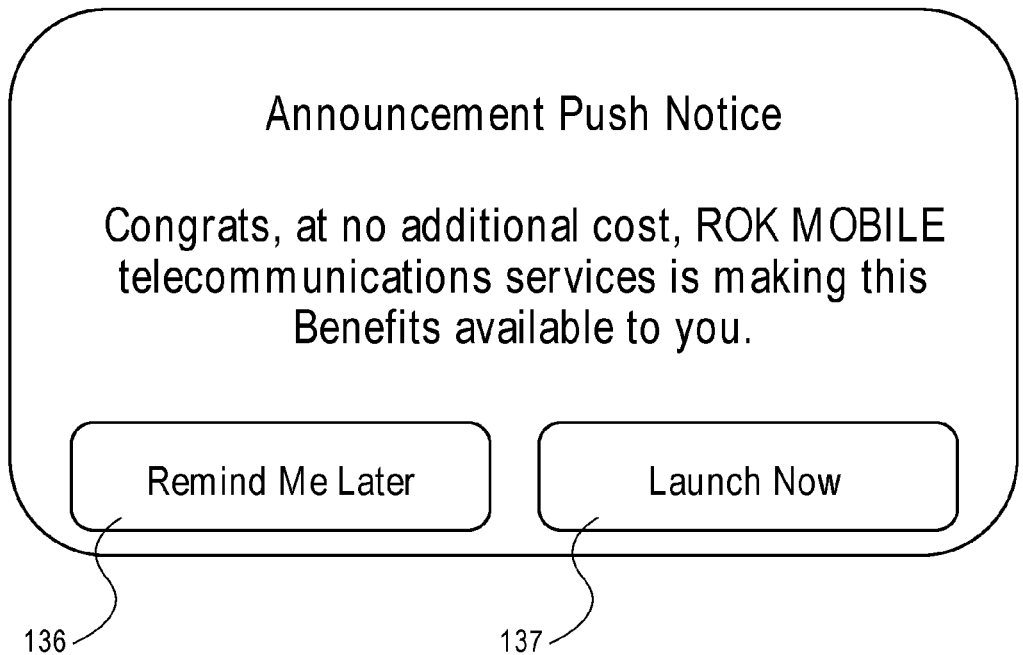
Figure 3B:
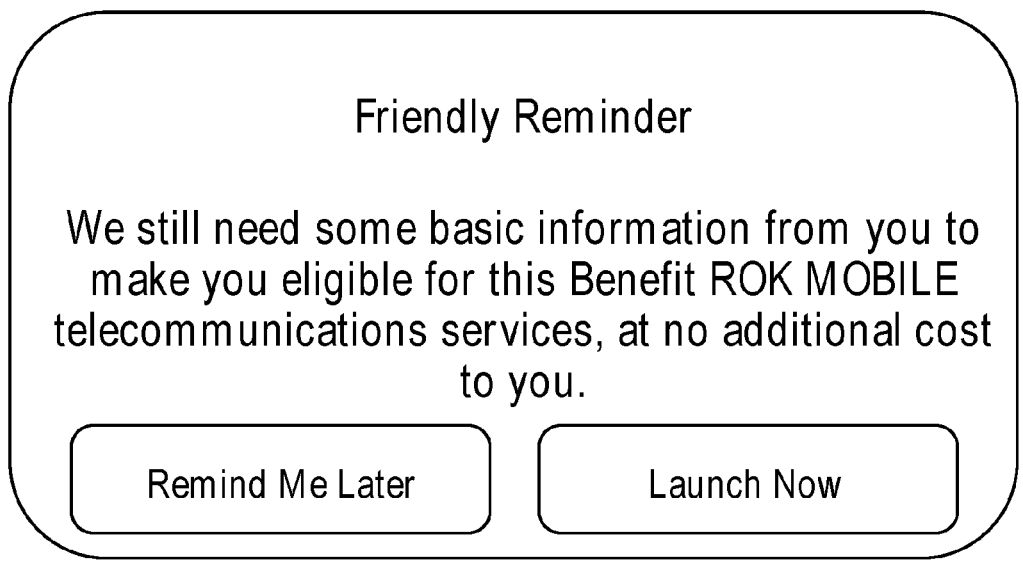

Returning to the notification 122, the reminder prompt 136 therein, when pressed by the user, will signal the programmed processor 110 to create a subsequent notification 122 that will be sent to the mobile device 120 at a later time, that contains at least the launch prompt 137—see FIG. 3b. A subsequent notification (which may be the second, third, fourth, etc.) may also contain a "not interested" prompt (not shown), which may be pressed by the user if the user is not interested in the benefit (a pre-bundled or individually selectable variety of products and services.) In response to the not interested prompt being pressed in the mobile device 120, the programmed processor is signaled to stop sending notifications that refer to such an offer (only to the mobile device 120 from which the not interested prompt was signaled, not others that are associated with their respective identifiers in the database.) Also, after a predetermined, maximum number of notifications 122 have been sent to the mobile device 120 without the launch prompt 137 being pressed (no affirmative response is received by the programmed processor 110), a final notification 122 is sent—see FIG. 3c—after which no further notifications are sent to the mobile device 120 (that refer to the user being eligible to receive benefit.)

In one embodiment, when the user presses the launch prompt, the mobile device responds by launching the application program 123. The application program 123 then prompts the user (e.g., displays the appropriate text on a touch screen of the mobile device 120) to provide personal information necessary to qualify the user for a pre-bundled or individually selectable variety of insurance products and services and/or other services (see below). Such personal information may include but is not limited to: first name, last name, date of birth, gender, email address, mailing address, beneficiary information, and contact information for the beneficiary. In one embodiment, the following fields or prompts may be displayed into which the user is to enter her personal information, noting especially that the five fields with an asterisk denote the "minimum personal information" needed:

First Name*
Last Name*
Date of Birth*
Mailing (street) Address
City
State
Postal Code*
Email Address*
Phone Number In other words, the mailing (street) address, the mailing city, the mailing state, and the phone number (which is in addition to the user's mobile phone number which is already known to the programmed processor 110) are not required, in order to receive the benefit offer. Additional optional personal information that may be entered by the user includes a billing address.

Figures 4A, 4B:
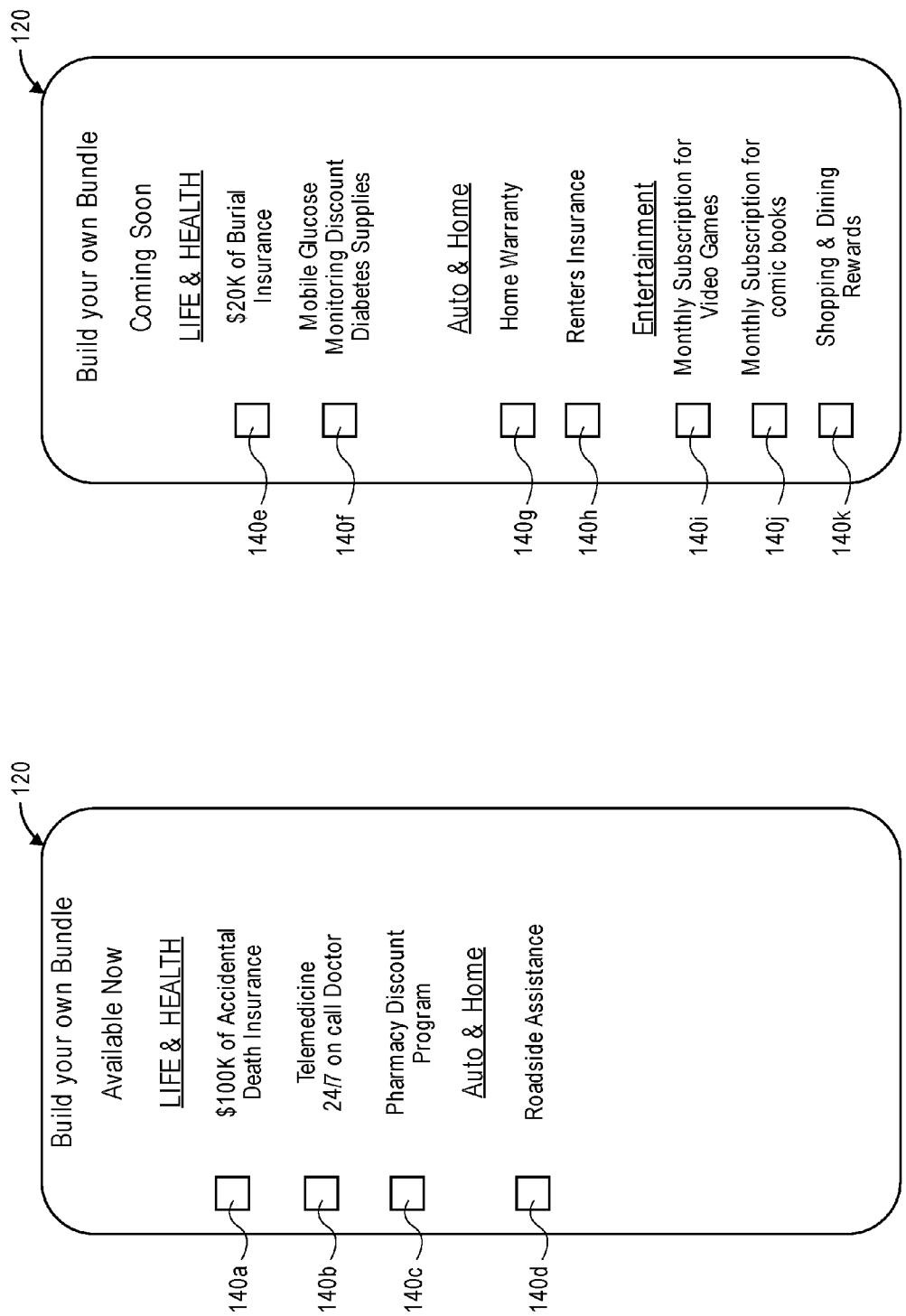
FIGS. 4a-4b show screen shots of the mobile device displaying a variety of individually selectable benefits from which the user can select.

The application program 123 then sends the user's entered personal information to the programmed processor 110, in response to which the programmed processor 110 verifies eligibility of the user to receive an offer of benefits, based on the user's minimum personal information that was received. The programmed processor 110 then sends to the application program 123 a list of benefits for which the user would be eligible. Example screen shots of the mobile device 120 displaying a list (received from the programmed processor 110) of individually selectable varieties of products and services that can be offered to the user at a group rate are shown in FIGS. 4a-4b. The list of benefits may alternatively, or in addition to the individually selectable variety, include a pre-bundled group of insurance products and services and/or other services, that are now being offered to the user a group rate. These products and services may include, but are not limited to, life insurance, telemedicine, health care insurance, roadside assistance, vehicle repair, vehicle collision insurance, pet insurance, travel insurance, monthly publication subscriptions, and consumer credit. The user is to then select individual ones (referred to here as individually selectable products and services, rather than pre-bundled) by pressing their option boxes 140a-140j, respectively.

In one embodiment, the pressed option boxes 140 of the pre-bundled group or the individually selected variety of products and services are signaled to the programmed processor 110, by the application program 123 or by the web site, and are then identified in the programmed processor 110 by a stored data structure (not shown). It is also contemplated that such a data structure may also be stored in the mobile device 120 as part of the application program 123. The latter may be accessed and configured or updated, remotely by the programmed processor 110.

In one embodiment, the stored data structure contains an indicator that one or more of the insurance products or services identified therein (either as part of the pre-bundled group or as part of the individually selectable variety) can be offered to the user at a "group rate" that is cheaper than a "market price" of that product or service. The market price may be the insurance premium amount that would be charged to the user if the user were an individual customer of an insurance service provider or other type of service provider (other than the telecommunications service provide) who is actually providing the offered product or service. This advantageous result of obtaining a cheaper rate for users of mobile devices (an instance of which is the mobile device 120) may be possible due to the telecommunication service provider (that is linked to the mobile devices) being able to leverage its customer base (the users of mobile devices that have purchased pre-paid phone plans from the telecommunication service provider), for collective bargaining with the original insurance service providers who are underwriting the insurance products or with the underlying service providers who are actually providing the other services, all of which may fall under the "Benefit" rubric described above and referred to in the drawings here, that are now being offered to the users of the mobile devices.

Still referring to FIG. 1, the application program 123, in response to receiving the user's selection, e.g. as a finger press against a touch screen of the mobile device 120, of a pre-bundled group or an individually selectable variety of products and services, sends the user's election to the programmed processor 110. The programmed processor 110 then in response calculates the cost of providing the user's elected benefits (insurance services and/or other services), based on a set of predefined rules stored in the processor 110 that govern the cost of various combinations of those services. The programmed processor 110 may then prepare a telecommunication service bill that references the user's account with the telecommunication service provider, or refers to the pre-paid telecommunication service plan including a telecommunication charge 142 for telecommunications services used, and also indicates the calculated cost or charge of providing the user's elected benefits, e.g., insurance or other services, as a benefits charge 143, in addition to a total charge 146 (that includes the sum of the telecommunications charge 142 and the benefits charge 143.) This is also referred to here as a composite bill—see FIG. 5 for an example. In one embodiment, it is the programmed processor 110 that calculates the cost of providing the user's selection of the benefits, based on the set of predefined rules governing the cost of various combinations of services. In another embodiment, a calculator program is provided as part of the application program 123 that is stored in the mobile, such that upon selection of the benefits by the user (the option boxes 140 have been pressed—see FIGS. 4a, 4b), it is the application program 123 itself (the calculator program therein) that calculates the benefits charge 143 and then displays this charge to the user, without having to signal and then wait for a response from the programmed processor 110. This is particularly advantageous for the user, since she immediately obtains a price quote for the benefits she has just elected. The calculator program (as part the application program 123) may be updated remotely from time to time by the programmed processor 110, so that the latest benefits and their prices are readily available to the user as the user's situation changes over time, enabling the user to efficiently adapt her selection of non-telecomm benefits (in response to, for example, a new notification being sent from the programmed processor 110 prompting the user to update her benefits package.)

Once the user has confirmed to the processor 110, via interaction with the application program 123, that she wishes to be covered by the elected insurance services or wishes to subscribe to the other services, the composite bill (see FIG. 5) is sent to the user's mobile device 120, e.g., via email or via the application program 123. In this manner, through the use of the mobile platform and notification technology described above, the user of a pre-paid telecommunication service is provided with insurance services (the elected pre-bundled group or the individually selectable variety) at a cheaper rate than the market price of those services, thereby decreasing the likelihood of the user departing to sign up with a competitor telecommunication service provider.

The notifications sent by the programmed processor 110 as described above may be SMS (text) messages addressed to a phone number of the mobile device 120, push notifications, which use push technology, in-app messages that appear only when the user is active in an application, or email. Push notifications may originate from a server. Typically, an end user of push technology must opt-in to receive notifications; opt-in usually takes place during an installation process that executes on the mobile device 120, once the user has purchased the pre-paid plan. An advantage of push notifications is that the technology doesn't require specific applications on the mobile device 120 to be open, in order for a notification to be received. This allows a smartphone (being an example of the mobile device 120) to receive and display social media and text message alerts even when the smartphone's screen is locked and the social media application that is pushing the notification is closed.

Different mobile devices and services rely on different methods to deliver push notifications. Developers of applications, web sites, or APIs for ANDROID and APPLE devices can use APIs to have their apps deliver push notifications to the mobile devices 120. Another approach is to use mobile backend as a service (mobile BaaS) cloud services to provide push notification functionality for a mobile app.

In other embodiments, however, the notifications delivered from the programmed processor 110 may be short message service (SMS), or text, messages that are addressed to the assigned phone number of the mobile device 120. In that case, the text message may contain a hyperlink that is represented as the launch prompt (when the text message is displayed in the mobile device 120) and has been inserted by the processor 110. When pressed by the user, the hyperlink may cause the application program 123 that is stored in the mobile device 120 to be "web application viewable", within the web browser 124, which in turn prompts the user (e.g., displays the appropriate text on the touch screen of the mobile device 120) to enter into application 123 the minimum personal information necessary to qualify the user as an "insured" of either a pre-bundled group or an individually selectable variety, of insurance products and services. The application program 123 then communicates the personal information entered by the user, to the programmed processor 110.

It is contemplated that when the programmed processor 110 delivers a notification to the mobile device 120, a timestamp is recorded in the programmed processor 110. If a response to the notification is not received from the mobile device 120 (e.g., from the application program 123) within a specified period of time after that which is indicated in the timestamp, then a second notification (whose content may be similar to that of the first notification in that it will include both the launch prompt 137 and the reminder prompt 136) will automatically be delivered, from programmed processor 110 to the mobile device 120. This helps ensure that a reasonable effort has been made to reach out to the user with the launch prompt.

It yet another embodiment, the mobile device 120 may receive the notification delivered from programmed processor 110 as a hyperlink within an email message that has been addressed to the user's email address (in this case, the user is deemed a "known" user.) When the hyperlink (that is in the email message) is pressed by the user, the application program 123 is launched. Again, the application program 123 may be a native application or a web application viewable within a web browser 124 running in the mobile device 120. Alternatively, pressing the hyperlink in the email message may cause the browser 124 to navigate to a Web site through which the personal information is obtained from the user (via entry into the browser 124.)

In one embodiment, when both the first notification and the subsequent, second notification are delivered (for example when the interval following the initial time stamp has reached and no response to the first notification has been received at the programmed processor), they are delivered during the first half of a billing cycle that immediately follows the minimum eligibility period defined above (e.g., 30 days.)

Referring now to FIG. 2, what is shown is a flow diagram of a method for precipitating a user of the mobile device 120 to accept a pre-bundled or individually selectable variety of insurance products and services that are on offer from the telecommunication service provider. The telecommunications service provider is the one that is providing voice, text messaging and Internet access (data) services to a user, through the mobile device 120. In particular, shown is a series of interactions between the mobile device 120, the user and the programmed processor 110. Note in this case that the existing telecommunication service plan, which has been agreed upon between the user and the service provider, need not be a pre-paid plan but instead may be a long term (e.g., 24 months) installment contract. The process begins with a first notification 222 being presented to the user. Next, where the user responds to the first notification 222 by electing to provide the minimum personal information required to take advantage of the offer, the application program 123 is launched in the mobile device 120 through which the user enters her personal information. Alternatively, where the first notification 222 may be an SMS (text) message that contains a hyperlink inserted by the telecommunication service provider, the election by the user causes the browser 124 in the mobile device 120 to navigate to a website (e.g., a mobile-optimized website) that is identified via the hyperlink. As another alternative, the election to provide the minimum personal information may be communicated or signaled back to the programmed processor 110 via an API. Where the user responds to the first notification 222 by electing to be reminded later of the offer, the user will be sent (later) a second notification 223. An example of the first notification 222 and the second notification 223 as displayed in the mobile device 120 are shown in FIG. 3a, 3b, respectively, in which the reminder prompt 136 and the launch prompt 137 are visible side by side and selectable by the user (via touchscreen for instance.)

When the application program 123 is launched or when the browser comes to foreground and navigates to a previously identified web site (in response to an election by the user of the launch prompt 137 in connection with the first notification 222 or the second notification 223), the user is prompted in the application program 123, or in the browser 124 at the website, to enter personally identifiable information, which is then sent to the programmed processor 110. In response to receiving the personal information, the programmed processor 110 computes or looks up the available benefits for which the user would be eligible (in view of her minimum personal information) and sends to the application program 123 a list of those benefits consisting of a pre-bundled group and/or an individually selectable variety, of insurance products and services. The programmed processor 110, in response to then receiving, via the application program 123 or via the browser at the web site, the user's election as between the pre-bundled group or the individually selectable variety, offers via the application program 123 or via the browser at the web site, an insurance service contract to the user, at a group rate that is cheaper than the market price of the elected insurance services individually.

In one embodiment, the notification 222 is a push notification containing a launch prompt and a remind later prompt, such that the user elects to provide the minimum required personal information by pressing the launch prompt, or elects to be reminded later of the offer by pressing the remind prompt. Where the user presses the launch prompt, application program 123 is launched. Where the user presses the remind prompt, the second notification 223 containing for example the same launch and reminder later prompts, will be presented to the user with a predetermined time interval after the first notification 222 was delivered.

It is contemplated that the second notification 223 could alternatively not contain the reminder prompt 136, but instead contain the launch prompt 137 and a "no thanks" prompt (not shown). The user may elect to provide the minimum required personal information by pressing the launch prompt, or she may elect to no take advantage of the offer and to no longer receive any notifications of the offer, by pressing the no thanks prompt.

In another embodiment, when the first notification 222 is a hyperlink within an SMS text message, such that the user may elect to provide the minimum personal information required by clicking the hyperlink (which then prompts the user with the various fields of the minimum personal information), the user may alternatively refrain from clicking on the hyperlink. In that case, following a time out interval (after the hyperlink is first displayed to the user), the programmed processor 110 treats the lack of response in this case to be a request to be reminded later, in which case the second notification 223 is then sent (here as a hyperlink within a new SMS text message.) Alternatively, the lack of a response (the hyperlink is not clicked or pressed, within a predetermined time interval after its display), may be interpreted by the programmed processor 110 as the user's intention to not take advantage of the offer and also to not be reminded of the offer (in which case the second notification 223 is not delivered.)

In yet another embodiment, the first notification 222 and the second notification 223 are hyperlinks within respective email messages.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, while FIG. 1 depicts the device in which for precipitating a user of a mobile device to select a pre-bundled or individually selectable variety of products and services. The description is thus to be regarded as illustrative instead of limiting.

The invention claimed is:

1. A computer system for precipitating an unknown user, whose first and last name are unknown to the computer system, to select a pre-bundled group or individually selectable variety of products or services, the computer system comprising:
 a programmed processor that is to
 i) access and initially configure a mobile device to enable provision of a pre-paid telecommunication plan through a telecommunication service provider and including voice, text and data services, to the unknown user of the mobile device, and
 ii) then deliver a first notification to the configured mobile device, which is to be presented to the unknown user, within the first half of a billing cycle of the pre-paid telecommunication plan, wherein the first notification is presented by displaying it on a display screen of the configured mobile device;
 wherein the first notification contains a launch prompt that, when selected in a user interface of the mobile device, is to launch an application program or navigate a browser to a web site through which the unknown user is to identify herself using her first and last name, and through which the user is then presented with one or both of a pre-bundled group or an individually selectable variety, of services offered by the telecommunication service provider that include one or more of life insurance, telemedicine, roadside assistance, vehicle repair, vehicle collision insurance, pet insurance, travel insurance, monthly publication subscriptions, and consumer credit.

2. The system of claim 1 wherein the programmed processor is to send a second notification to the mobile device, wherein the first and second notifications are delivered at a predetermined interval relative to each other, during the first half of the unknown user's billing cycle following a minimum eligibility period which is a predetermined amount of time in which the user has maintained an active account with the telecommunication provider.

3. The system of claim 2 wherein each of the notifications further contains a remind prompt, wherein the programmed processor is to remind the user later, rather than launch the application program or navigate the browser to the web site, in response to an indication from the mobile device that the remind prompt has been selected.

4. The system of claim 1, wherein in response to receiving an indication that the launch prompt has been selected, the programmed processor communicates with the application program or the web site or with an applications programming interface (API), which in turn presents a plurality of prompts on the mobile device requesting that the user identify herself using her first and last name and make a selection between either i) the pre-bundled group or ii) the individually selectable variety, of services.

5. The system of claim 4 wherein the application program or the web site or the API displays on the mobile device the pre-bundled group of services and the individually selectable variety of products or services as including a subset of the group consisting of: telemedicine, roadside assistance, vehicle collision insurance, pet insurance, travel insurance, monthly publication subscriptions, and consumer credit.

6. The system of claim 5 wherein the programmed processor, in response to receiving, via the application program or the web site, the user's selection between the pre-bundled group or the individually selectable variety of products and services, offers, via the application program or the web site, the selected product or service to the user at a group rate that is cheaper than the market price of the product or service individually.

7. The system of claim 6 wherein the programmed processor calculates the cost of providing the user's selection of the products or services based on a set of predefined rules governing the cost of various combinations of services.

8. The system of claim 7 wherein the programmed processor is to prepare and send to the mobile device a telecommunication service bill for the user, wherein the same telecommunication service bill identifies both the pre-paid telecommunication service and the calculated cost of providing the user's selection of products or services.

9. The system of claim 6 wherein the group rate for insurance services that is offered to the user, is bargained for and obtained from an insurance provider of said insurance services, being a separate entity than the telecommunication service provider, by leveraging the customer base of the telecommunication service provider.

10. The system of claim 1 wherein the unknown user is a user that is identifiable to programmed processor only by a customer identification number, and not by the user's first and last name.

11. A method performed by a computer system for precipitating a user, who is unknown to the telecommunication service provider, to select a pre-bundled or individually selectable variety of products and services, and whose first and last name are unknown to the computer system, the method comprising:
providing a pre-paid telecommunication plan through the telecommunication service provider and including phone, text and data services to the unknown user of a mobile device by accessing and initially configuring the mobile device to enable provision of the pre-paid telecommunication plan;
in response to initially configuring the mobile device and while the user is still unknown to the computer system, sending a first notification to the configured mobile device of the user for display on a display screen of the configured mobile device, wherein the displayed first notification contains a launch prompt that when selected by the user is to launch an application program or navigate a browser to a website which then prompt the user to identify herself using minimum personal information that includes her first and last name; and
in response to receiving the minimum personal information, signaling the configured mobile device to display to the user an offer of i) a pre-bundled group of, or ii) an individually selectable variety of, products or services offered by the telecommunication service provider that include one or more of life insurance, telemedicine and health care services, roadside assistance, vehicle repair services, and vehicle insurance services.

12. The method of claim 11 further comprising:
sending a second notification to the mobile device of the user, wherein each of the first and second notifications contains a reminder prompt and a launch prompt, wherein the first and second notifications are delivered to the user in the mobile device at predetermined intervals during the first half of a billing cycle following a minimum eligibility period in which the user has maintained an active account with the telecommunication provider.

13. The method of claim 12 further comprising:
responding to an indication that the launch prompt has been selected, the programmed processor communicates with the application program or the web site which in turn presents a plurality of prompts on the mobile device requesting the user identify herself using her first and last name and making a selection between either i) a pre-bundled group of, or ii) an individually selectable variety of, products and services, wherein the pre-bundled group and individually selectable variety of products and services include at least one of the group consisting of: life insurance, roadside assistance, vehicle collision insurance, telemedicine, pet insurance, travel insurance, monthly publication subscriptions, and consumer credit.

14. The method of claim 13 wherein the offer signaled to the mobile device is for providing an insurance service to the user at a group rate that is cheaper than the market price of the insurance service individually, wherein the group rate is obtained by leveraging the customer base of the telecommunication service provider to bargain and obtain a group rate.

15. The method of claim 14 wherein signaling of the offer, via the application program or the website, of the insurance service to the user is made only when the minimum personal information is received from the mobile device.

16. The method of claim 12 wherein the first and second notifications are sent at a predetermined interval relative to each other, both during the first half of the user's billing cycle that immediately follows a minimum eligibility period which is a predetermined amount of time in which the user has maintained an active account with the telecommunication provider.

17. The method of claim 11 wherein the user is an unknown user in that the user is identifiable to the computer system only by a customer identification number, and not by the user's first and last name, until the minimum personal information is received in response to the first notification.

18. The method of claim 11 wherein the first notification is one of the group consisting of a push notification, an SMS text message, in-app message, and an email, and wherein the launch prompt is one of the group consisting of a button within a push notification, a hyperlink within an SMS text message, and a hyperlink within an email.

19. The method of claim 11 wherein the first notification further comprises a reminder prompt that is displayed to the user simultaneously with the launch prompt, the method further comprising sending a second notification to the mobile device of the user in response to being signaled due to the reminder prompt being selected in the mobile device.

* * * * *